(No Model.)
J. CUTHBERTSON.
CAN OR MEASURE.
No. 376,768. Patented Jan. 24, 1888.
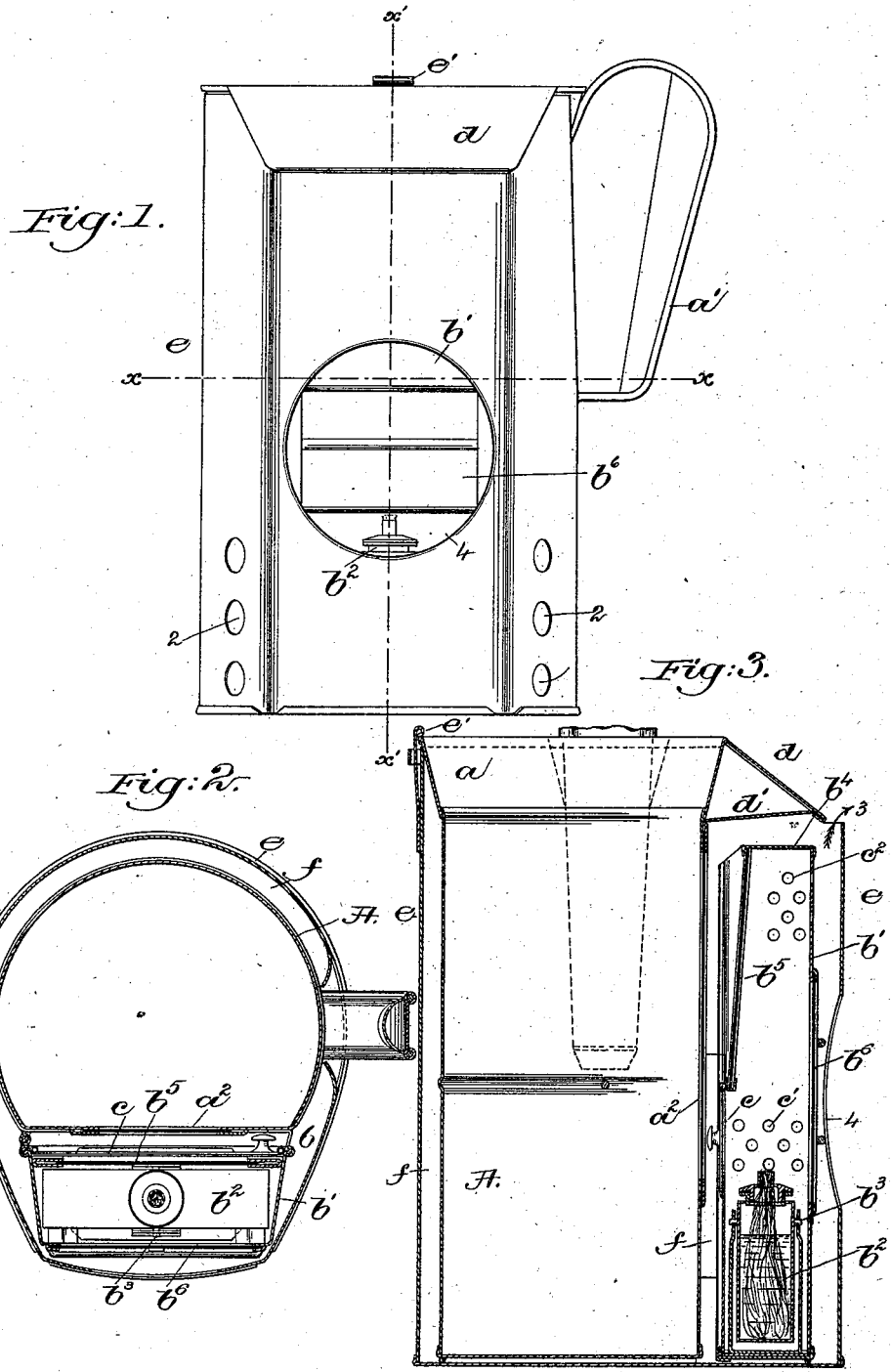
Witnesses.
Fred L. Emery.
John F. C. Prinkest.
Inventor.
John Cuthbertson
by Crosby & Gregory attys.

UNITED STATES PATENT OFFICE.

JOHN CUTHBERTSON, OF LOWELL, MASSACHUSETTS.

CAN OR MEASURE.

SPECIFICATION forming part of Letters Patent No. 376,768, dated January 24, 1888.

Application filed September 20, 1887. Serial No. 250,154. (No model.)

*To all whom it may concern:*

Be it known that I, JOHN CUTHBERTSON, of Lowell, county of Middlesex, and State of Massachusetts, have invented an Improvement in Cans or Measures, of which the following description, in connection with the accompanying drawings, is a specification, like letters on the drawings representing like parts.

This invention is an improvement on that described in United States Patent No. 366,380, granted to me July 12, 1887, and has chiefly for its object to provide a can substantially such as described in the said patent with a jacket, the air between the jacket and can being warmed by the lamp, to prevent freezing of the liquid on the can.

Herein the lamp-compartment, covered at its upper end, is provided with a series of holes near its lower end and at its sides and front near the top, for the supply of air to the lamp and the discharge of the products of combustion. The rear side of the lamp is provided with a short door-section having isinglass and a stationary section containing isinglass. The can above the closed top of the lamp-compartment is provided with an overhanging lip which is projected outwardly beyond the lamp-compartment, and forms a top for the jacket above the lamp.

Figure 1, in elevation, shows a jacketed can embodying my invention; Fig. 2, a section in the line $x$, Fig. 1; and Fig. 3, a section in the line $x'$.

The can or measure A, having a flaring top, $a$, and a handle, $a'$, has at its rear side, as at $a^2$, a pane of transparent material, as isinglass, and at the side of the said can or measure is hinged, as at $b$, a lamp-compartment, $b'$, the said compartment having within it a lamp, $b^2$, hung on trunnions, as $b^3$.

As so far described, the parts are substantially as in the said patent. I have, however, herein shown the lamp-compartment as closed at its top by a top plate, $b^4$, the rear side of the compartment having a transparent pane, $b^5$, and at its front the said compartment has a transparent pane, $b^6$. The lower portion of the compartment at its inner side has a hinged door, $c$, provided with a transparent pane. The said door may be opened when the lamp-compartment is swung away from the can, to thus permit the introduction or removal of the lamp.

The compartment has air inlets $c'$ and outlets $c^2$ for the products of combustion of the lamp. The compartment at the top has soldered to it at one side an overhanging lip, $d$, the lip being supported at its lower edge by a brace, $d^2$, the braced lip acting as a cover for that part of the jacket $e$ immediately above the top of the lamp-compartment, as best shown in Fig. 3.

The can or measure described is inclosed by a jacket, $e$, provided, as herein shown, with a catch or locking device, $e'$, made as a spring-plate to catch over the flaring lip at the top of the can, the jacket being enough larger than the can to afford an air-space, as $f$, to contain air which is kept warm by the heat radiated from the lamp. The air in the chamber is not heated to such extent as to injuriously warm or heat the milk, but only to keep the milk from chilling or freezing on the can or measure. The jacket at or near its lower end is provided with air-inlets, as 2, the warm air escaping at the edge of the lip $d$, as shown by arrow 3. The jacket has a hole in its side, as at 4, opposite the transparent side $b^6$ of the lamp-compartment, for the emission of light. The jacket is slotted at one side for the reception of the handle $a'$.

I claim—

1. The can or measure having a transparent side, combined with the lamp-compartment having a closed top, and provided with a transparent back and front, and with air inlets and outlets, and with the hinged door having a transparent pane, substantially as described.

2. The can or measure open at top, and the lamp-compartment and lamp, combined with the inclosing-jacket provided with an opening, 4, for the outward passage of rays of light, substantially as described.

3. The can or measure open at top and having a transparent side and a lip, $d$, and the lamp-compartment having a transparent back and front, and the lamp, combined with the inclosing-jacket, to operate substantially as described.

In testimony whereof I have signed my name to this specification in the presence of two subscribing witnesses.

JOHN CUTHBERTSON.

Witnesses:
G. W. GREGORY,
B. DEWAR.